(12) United States Patent
Moser et al.

(10) Patent No.: US 9,016,104 B2
(45) Date of Patent: Apr. 28, 2015

(54) PROCESS FOR PRODUCING A BODY PROVIDED WITH A SLOT AS A TEST CRACK

(75) Inventors: Roland Richard Moser, Zürich (CH); Philipp Roth, Baden (CH)

(73) Assignee: Alstom Technology Ltd., Baden (CH)

( * ) Notice: Subject to any disclaimer, the term of this patent is extended or adjusted under 35 U.S.C. 154(b) by 453 days.

(21) Appl. No.: 12/754,720

(22) Filed: Apr. 6, 2010

(65) Prior Publication Data

US 2010/0269593 A1    Oct. 28, 2010

(30) Foreign Application Priority Data

Apr. 22, 2009 (CH) ........................................ 633/09

(51) Int. Cl.
*G01D 18/00* (2006.01)
*B24C 1/04* (2006.01)
*B82Y 35/00* (2011.01)

(52) U.S. Cl.
CPC .. *B24C 1/04* (2013.01); *B82Y 35/00* (2013.01)

(58) Field of Classification Search
CPC .......... G01D 18/00; G01B 5/28; B82Y 35/00; G01L 27/005
USPC ................................ 73/1.01, 1.63, 104, 866.4
See application file for complete search history.

(56) References Cited

U.S. PATENT DOCUMENTS

| | | | | |
|---|---|---|---|---|
| 4,445,360 A | * | 5/1984 | Treder, Jr. | 73/588 |
| 5,704,824 A | * | 1/1998 | Hashish et al. | 451/36 |
| 6,634,928 B2 | * | 10/2003 | Erickson et al. | 451/40 |
| 2003/0092364 A1 | * | 5/2003 | Erickson et al. | 451/75 |
| 2009/0311416 A1 | * | 12/2009 | Nelson et al. | 427/8 |

FOREIGN PATENT DOCUMENTS

| | | |
|---|---|---|
| EP | 1378498 | 1/2004 |
| EP | 1707315 | 10/2006 |
| EP | 1839739 | 10/2007 |
| WO | WO2007/046143 | 4/2007 |
| WO | WO2008/083889 | 7/2008 |

OTHER PUBLICATIONS

Search Report for Swiss Patent App. No. 00633/09 (Jul. 31, 2009).

* cited by examiner

*Primary Examiner* — Hezron E Williams
*Assistant Examiner* — Rodney T Frank
(74) *Attorney, Agent, or Firm* — Buchanan Ingersoll & Rooney PC

(57) ABSTRACT

A process for producing a reference body (10) provided with a slot (17) as a test crack for the nondestructive testing of materials can be used flexibly and includes the following steps:

a) a reference body (10) and a mask (11) provided with a slot pattern (12) are provided;

b) the mask (11) is applied to the reference body (10);

c) material is removed from the reference body (10) through the mask (11) with an abrasive water jet (16); and d) the mask (11) is taken off the reference body (10).

10 Claims, 3 Drawing Sheets

PROCESS FOR PRODUCING A BODY PROVIDED WITH A SLOT AS A TEST CRACK

This application claims priority under 35 U.S.C. §119 to Swiss application No. 00633/09, filed 22 Apr. 2009, the entirety of which is incorporated by reference herein.

BACKGROUND

1. Field of Endeavor

The present invention deals with the field of workpiece machining. It relates to a process for producing a body provided with a slot as a test crack, in particular, a reference body for the nondestructive testing of materials.

2. Brief Description of the Related Art

Nondestructive inspections of components which are subject to high levels of loading and are susceptible to cracking are of major importance for power plants which are operated for relatively long periods, in order to detect incipient damage in good time and to take countermeasures in order to ensure high overall availability. In order to make it possible to calibrate the apparatus and processes for the nondestructive testing of materials and detection of cracks used for these inspections, e.g., ultrasound processes, use is made of test bodies with artificially produced crack-like structures, i.e., test cracks.

Since the cracks which occur naturally are very narrow and the widths of these cracks are typically in the sub-millimeter range, it is not possible to produce test cracks such as these using conventional material machining methods such as, for example, drilling or milling. To date, therefore, the standard method used for the artificial production of cracks has been the spark erosion process (electrical discharge machining or EDM). For small crack-like structures, use is made, in particular, of the plunge erosion process (sinker EDM) in which the workpiece to be machined is immersed in a dielectric liquid such as, for example, oil and machined using an electrode, the shape of which corresponds to the recess to be produced in the workpiece. A power supply produces an electrical potential difference between the workpiece and electrode. If the electrode approaches the workpiece, the insulation provided by the dielectric liquid breaks down and a spark skips between the electrode and workpiece. The heat and cavitation thereby produced locally vaporize the material of the workpiece (and, to a certain extent, of the electrode as well), and this provides a continuous material removal process.

However, a critical limitation of the EDM process is that it can be used only for electrically conductive materials, which are mostly iron alloys. EDM can cut small or unusually shaped angles, complicated contours or recesses in hardened steel without the need for heat treatments for soft-annealing or renewed hardening, and it can also be used for exotic materials such as titanium, Hastelloy®, Kovar® and Inconel®.

However, the limitation with respect to the size of the workpieces is particularly critical in terms of the production of test cracks for the nondestructive testing of materials by EDM. Since the workpieces have to be immersed in a bath of a dielectric liquid, it is not possible to machine large and heavy structures such as, for example, large forged pieces or pipes in this way.

On the other hand, it is known to machine workpieces by using an abrasive, high-pressure water jet (abrasive water jet or AWJ) which can make cuts in a material such as, for example, a stainless steel sheet or the like (see document U.S. Pat. No. 5,018,317). A water jet such as this may also be used at inaccessible locations in order to remove pins from machinery (see document WO-A1-2008/083889). Finally, it is possible (see document U.S. Pat. No. 5,704,824) to use an AWJ apparatus first to produce a resistant mask and then to carry out material-removing machining on a workpiece through this mask.

SUMMARY

One of numerous aspects of the present invention relates to a process which makes it possible to introduce artificial cracks in a simple manner into test bodies of any desired size and materials properties for the nondestructive testing of materials.

Another aspect of the present invention is based on the concept that the use of a purely mechanical process for producing test cracks means that the size limitation resulting from the insulation bath and the limitation to electrically conductive materials no longer apply. In addition, an aspect is based on the finding that the AWJ process is suitable as a mechanical process for producing the desired, extremely fine structures if appropriate masking is used and abrasive additives with the appropriate grain size are selected.

Another aspect of the present invention involves the following steps:
a) a reference body and a mask provided with a slot pattern are provided;
b) the mask is applied to the reference body;
c) material is removed from the reference body through the mask by an abrasive water jet; and
d) the mask is taken off the reference body.

One refinement of processes embodying principles of the present invention is characterized in that use is made of a mask formed of a material which is considerably more resistant to the abrasive water jet than the reference body. The mask preferably is formed of a hard metal, in particular tungsten carbide, or a hard ceramic.

According to another refinement, the mask is in the form of a thin plate.

Exemplary processes according to the invention are particularly simple if the mask is magnetic or, on the underside, adhesive so that it can be fastened on the reference body.

A further refinement of a process according to principles of the present invention is distinguished in that a mixture of water and a fine-grain abrasive additive is used for the abrasive water jet. The additive used in the mixture is preferably an oxide ceramic or a garnet.

In particular, the finest structures are achieved when the mean grain size of the additive is in the region of 1 micrometer or less.

Another refinement of a process according to principles of the present invention is characterized in that an abrasive water jet having a nozzle diameter of 0.5 mm to 1.0 mm is used, and in that the water jet is produced with a pressure of 120 bar to 200 bar.

The slot pattern of the mask preferably has a characteristic width in the sub-millimeter range.

BRIEF DESCRIPTION OF THE DRAWINGS

The invention will be explained in more detail below with reference to exemplary embodiments in conjunction with the drawing, in which.

DETAILED DESCRIPTION OF EXEMPLARY EMBODIMENTS

In the present context, an abrasive water jet (AWJ) is understood to mean a high-pressure water jet which is intended for machining or removing material and includes a mixture of water and an abrasive additive which emerges at pressures between 200 and 4000 bar. The additive is comparable to fine sand and typically includes grains of oxide ceramic or garnet having a diameter of less than 0.5 mm. AWJ is used for cutting, polishing, or cleaning surfaces. The grain diameter of the additive may be very small and, in the case of commercially available substances, may be in the range of micrometers. A fine additive such as this is conventionally used for polishing optical glasses (lenses) or the like with a precision in the micrometer range.

Figure 1:
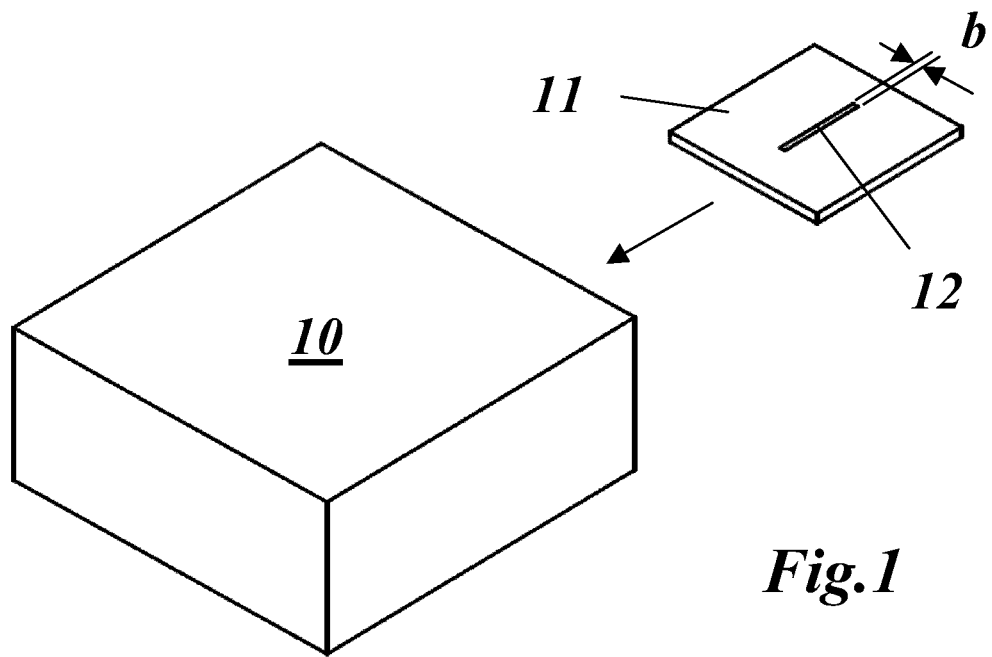
FIG. 1 shows the provision of a reference body and an associated mask in a first step of the process according to an exemplary embodiment of the invention.

In the present invention, an AWJ is used to produce a reference body which, in order to calibrate a nondestructive test process, can be used to simulate a workpiece 18 (shown in FIG. 5) which has a (natural) crack 19. A process embodying principles of the present invention uses a water jet containing a very fine-grain additive. According to FIG. 1, the process is based on a suitable reference body 10 which is shown as a simple cuboid in FIG. 1, but may also have the shape of a piece of tubing, a housing part, or another component conventionally found in a power plant. In order to machine the reference body 10, i.e., to introduce a slot (17 in FIG. 4) which functions as a "test crack", a mask 11 which is in the form of a thin plate and is provided with a corresponding slot pattern 12 permeable to the water jet, is provided.

The mask 11 is produced from a material which, by contrast with the material of the reference body 10, is hard and resistant, in particular from a hard metal such as tungsten carbide, or a hard ceramic. The slot pattern 12, through which the abrasive water jet removes the material of the reference body 10, determines the shape of the slot 17 produced. The characteristic width b of the slot pattern 12 is in the sub-millimeter range in order to recreate the effect of a natural crack as accurately as possible for the nondestructive testing of materials. The depth of the slot 17 produced depends on the amount of time for which the abrasive water jet selectively acts on the reference body 10 through the mask 11. The geometry of the slot 17 which is produced is the same as that of a slot produced by the EDM process.

Figure 2:
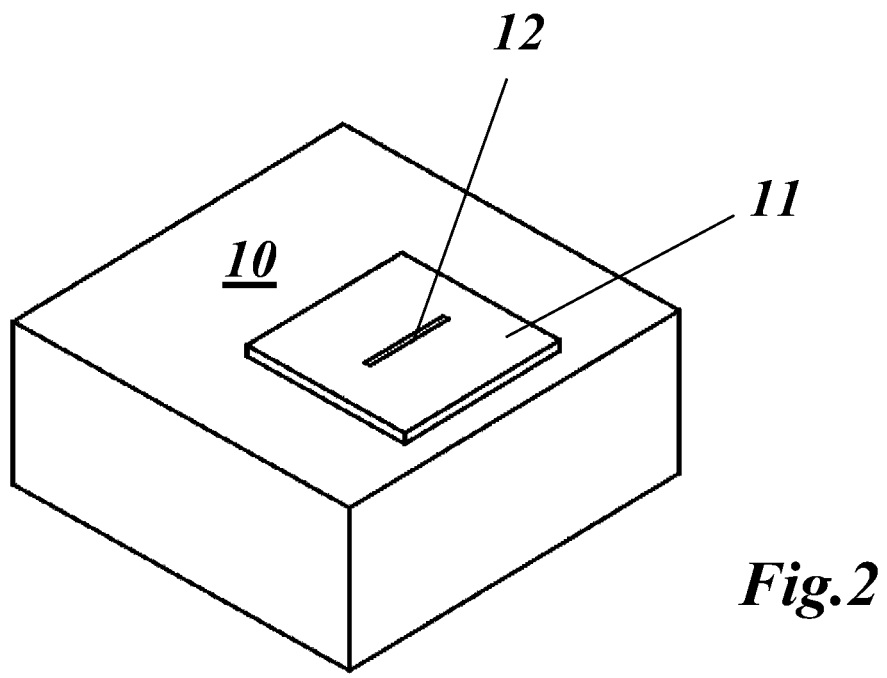
FIG. 2 shows the application of the mask to the reference body in a second step of the process according to an exemplary embodiment of the invention.
Figure 3:
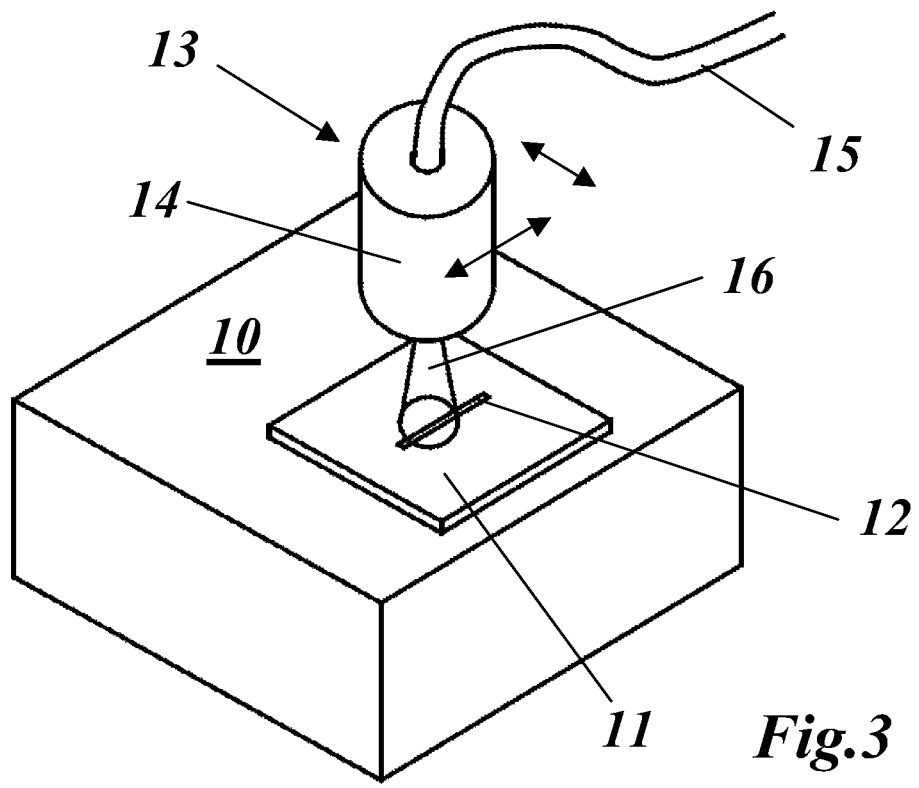
FIG. 3 shows the introduction of a slot provided as a test crack through the mask by AWJ in a third step of the process according to an exemplary embodiment of the invention.

According to FIG. 2, the slot 17 is produced by arranging and fixing the mask 11 on the reference body 10 at a point intended for this purpose. This can be carried out by magnetics if the mask 11 is magnetic and the reference body 10 is formed of a magnetizable material. However, the underside of the mask may also be provided with an adhesive layer which holds the mask 11 firmly on the surface of the reference body 10. If the mask 11 is in place, a water jet apparatus 13 (the detailed structure of which is not shown here but can be gathered from the documents mentioned in the introduction) is used to direct a water jet 16 containing abrasive additives in suspension onto the mask 11 in such a way that material is removed from a region of the reference body 10 which corresponds to the slot pattern 12 of the mask 11, and this region is recessed to form a slot 17. If the diameter of the impinging water jet 16 is smaller than the lateral dimensions of the slot pattern 12, this is done by guiding the jet head 14, which produces the water jet 16 and is supplied with the abrasive suspension via a supply tube 15, in a predetermined manner over the region of the slot pattern 12, as indicated by the double arrows in FIG. 3.

The physical parameters of the process, such as pressure, grain size, temperature, or nozzle geometry, can be adapted with respect to the desired slot geometry, slot depth, and surface quality. In practice, a pressure of 120 bar to 200 bar, a nozzle diameter for the water jet of 0.5 mm to 1.0 mm, and a mean grain diameter of 1 micrometer or less have proved to be suitable. A self-adhering mask and a mobile cutting apparatus, as disclosed in document WO-A1-2008/083889 mentioned in the introduction, also make it possible to machine locations on a reference body which are difficult to access or even to produce test cracks directly on a part of the plant.

Figure 4:
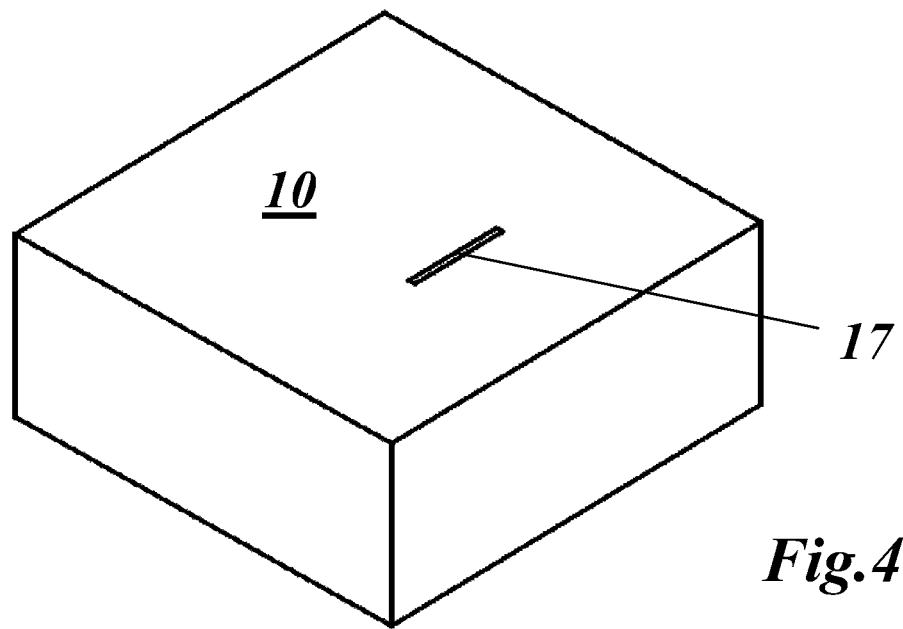
FIG. 4 shows the fully machined reference body.
Figure 5:
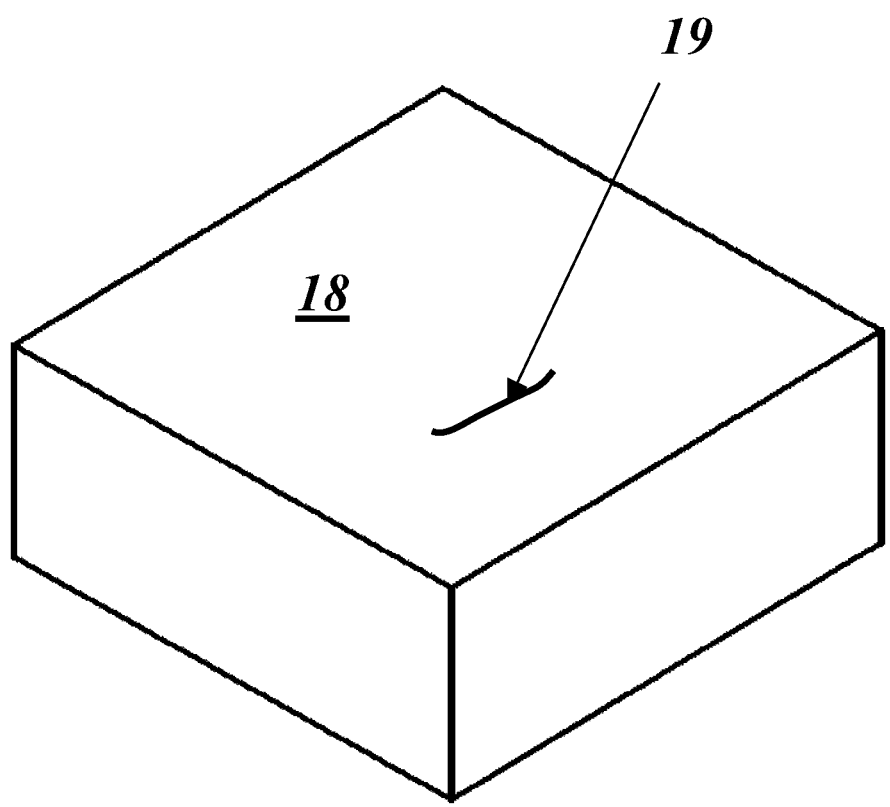
FIG. 5 shows, for comparison, a workpiece with a crack.

After a predefined machining time, the water jet apparatus 13 is stopped and removed. A reference body 10 which has a defined slot 17 as a test crack at the predefined location remains after the mask 11 is taken off (FIG. 4).

It is obvious that the flexibility of the process also makes it possible to provide components of the power plant directly with corresponding slots or slot patterns before or after they are installed. Furthermore, it is conceivable to use the process described to produce other slot structures as are used, for example, in so-called microfluidic reactors for chemistry (see, for example, EP-A1-1 839 739).

LIST OF REFERENCE NUMERALS

10 Reference body
11 Mask
12 Slot pattern
13 Water jet apparatus (abrasive)
14 Jet head
15 Supply tube
16 Water jet
17 Slot (test crack)
18 Workpiece
19 Crack While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A process for producing a reference body with a slot as a test crack for the nondestructive testing of materials, the process comprising:

providing a reference body and a mask having a slot pattern with a sub-millimeter width; applying the mask to the reference body;

removing material from the reference body through the mask with an abrasive water jet that consists of a pressurized abrasive suspension to form the slot having a predefined slot depth; including removing material with the abrasive water jet from a nozzle of a water jet apparatus having a diameter of 0.5 mm to 1.0 mm, and with a water jet with a pressure of 120 bar to 200 bar;

stop removing material after a predefined machining time and removing the water jet apparatus; and removing the mask from the reference body.

2. The process as claimed in claim 1, wherein providing the mask comprises providing a mask formed of a material which is more resistant to the abrasive water jet than the material of the reference body.

3. The process as claimed in claim 2, wherein providing the mask comprises providing a mask formed of a hard metal.

4. The process as claimed in claim 2, wherein providing the mask comprises providing a mask formed of tungsten carbide or a hard ceramic.

5. The process as claimed in claim 1, wherein providing the mask comprises providing a mask in the form of a thin plate.

6. The process as claimed in claim 1, wherein providing the mask comprises providing a magnetic mask or an adhesive on an underside of the mask so that the mask can be fastened on the reference body.

7. The process as claimed in claim 1, wherein removing material comprises removing with a mixture of water and a fine-grain abrasive additive as the abrasive water jet.

8. The process as claimed in claim 7, wherein the additive is an oxide ceramic or a garnet.

9. The process as claimed in claim 7, wherein the mean grain size of the additive is 1 micrometer or less.

10. A process for producing a reference body and calibrating a testing apparatus, the process comprising:

producing the reference body with a slot as a test crack with a process including:

providing a reference body and a mask having a slot pattern with a sub-millimeter width; applying the mask to the reference body, removing material from the reference body through the mask with an abrasive water jet that consists of a pressurized abrasive suspension to form the slot having a predefined slot depth; including removing material with the abrasive water jet from a nozzle of a water jet apparatus having a diameter of 0.5 mm to 1.0 mm, and with a water jet with a pressure of 120 bar to 200 bar;

stop removing material after a predefined machining time and removing the water jet apparatus; and removing the mask from the reference body; and calibrating the testing apparatus, testing processes, or both with the reference body test crack, wherein the testing processes comprise ultrasound processes.

* * * * *